US012770924B2

(12) United States Patent
Han et al.

(10) Patent No.: US 12,770,924 B2
(45) **Date of Patent: *Oct. 20, 2026**

(54) LITHIUM SECONDARY BATTERY WITH INHIBITED EXSOLUTION OF TRANSITION METAL

(71) Applicant: LG Energy Solution, Ltd., Seoul (KR)

(72) Inventors: Jun Hyeok Han, Daejeon (KR); Su Hyeon Ji, Daejeon (KR); Chul Haeng Lee, Daejeon (KR); Kyoung Ho Ahn, Daejeon (KR); Won Kyung Shin, Daejeon (KR); Won Tae Lee, Daejeon (KR); Young Ho Oh, Daejeon (KR); You Kyeong Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 766 days.

This patent is subject to a terminal disclaimer.

(21) Appl. No.: 18/113,329

(22) Filed: Feb. 23, 2023

(65) Prior Publication Data

US 2023/0299351 A1 Sep. 21, 2023

(30) Foreign Application Priority Data

Mar. 21, 2022 (KR) ........................ 10-2022-0034571
Feb. 1, 2023 (KR) ........................ 10-2023-0013790

(51) Int. Cl.

| | |
|---|---|
| ***H01M 10/0567*** | (2010.01) |
| ***H01M 4/02*** | (2006.01) |
| ***H01M 4/36*** | (2006.01) |
| ***H01M 4/38*** | (2006.01) |
| ***H01M 4/485*** | (2010.01) |
| ***H01M 4/505*** | (2010.01) |
| ***H01M 4/525*** | (2010.01) |
| ***H01M 4/583*** | (2010.01) |
| ***H01M 10/052*** | (2010.01) |
| ***H01M 10/0568*** | (2010.01) |
| ***H01M 50/46*** | (2021.01) |

(52) U.S. Cl.

CPC ....... *H01M 10/0567* (2013.01); *H01M 4/364* (2013.01); *H01M 4/386* (2013.01); *H01M 4/485* (2013.01); *H01M 4/505* (2013.01); *H01M 4/525* (2013.01); *H01M 4/583* (2013.01); *H01M 10/052* (2013.01); *H01M 10/0568* (2013.01); *H01M 50/46* (2021.01); *H01M 2004/027* (2013.01); *H01M 2004/028* (2013.01); *H01M 2300/0025* (2013.01)

(58) Field of Classification Search

CPC .. H01M 10/0567; H01M 50/46; H01M 4/364; H01M 4/386; H01M 4/485; H01M 4/505; H01M 4/525; H01M 4/583; H01M 10/052; H01M 10/0568; H01M 2004/027; H01M 2004/028

USPC .......................................................... 429/203

See application file for complete search history.

(56) References Cited

U.S. PATENT DOCUMENTS

| | | | |
|---|---|---|---|
| 2014/0220455 A1 | 8/2014 | Lee et al. | |
| 2014/0234729 A1 | 8/2014 | Kanazawa et al. | |
| 2017/0117536 A1 | 4/2017 | Choi et al. | |
| 2019/0051937 A1 | 2/2019 | Ahn et al. | |
| 2020/0176754 A1 | 6/2020 | Lho et al. | |
| 2020/0185771 A1 | 6/2020 | Lee et al. | |
| 2021/0218058 A1 | 7/2021 | Ahn et al. | |
| 2021/0288320 A1* | 9/2021 | Kawada ............ | H01M 10/0525 |
| 2022/0181627 A1 | 6/2022 | Park et al. | |
| 2022/0209294 A1 | 6/2022 | Lee et al. | |

FOREIGN PATENT DOCUMENTS

| | | |
|---|---|---|
| CN | 108717977 A | 10/2018 |
| CN | 111164818 A | 5/2020 |
| CN | 112313817 A | 2/2021 |
| CN | 112436187 A | 3/2021 |

(Continued)

OTHER PUBLICATIONS

Extended European Search Report including Written Opinion for Application No. 23775151.6 dated Nov. 25, 2024. 8 pgs.

*Primary Examiner* — Allison Bourke
*Assistant Examiner* — Robert Gene West
(74) *Attorney, Agent, or Firm* — Lerner David LLP

(57) ABSTRACT

A lithium secondary battery includes $Li_6CoO_4$ containing excess lithium, or the like as an irreversible additive in a positive electrode, and at the same time, includes an electrolyte additive of Formula 1 having a specific molecular weight in an electrolyte to realize low battery resistance and effectively prevent metal ions from being exsolved from the irreversible additive, and thus has advantages of excellent battery performance and lifespan,

[Formula 1]

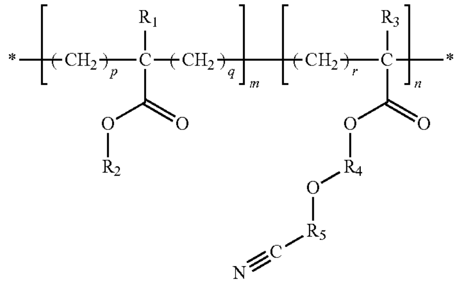

wherein $R_1$ to $R_5$, p, q, r, m and n are described herein.

20 Claims, No Drawings

(56) References Cited

FOREIGN PATENT DOCUMENTS

| | | | |
|---|---|---|---|
| CN | 112490490 | A | 3/2021 |
| CN | 113678299 | A | 11/2021 |
| EP | 3780223 | A1 | 2/2021 |
| JP | H04198310 | A | 7/1992 |
| JP | 2953047 | B2 * | 9/1999 |
| JP | 2015168754 | A | 9/2015 |
| JP | 2019061750 | A | 4/2019 |
| JP | 2020024947 | A | 2/2020 |
| JP | 2021501451 | A | 1/2021 |
| JP | 2022510983 | A | 1/2022 |
| KR | 20140100290 | A | 8/2014 |
| KR | 20170047661 | A | 5/2017 |
| KR | 101773680 | B1 | 8/2017 |
| KR | 101884568 | B1 | 8/2018 |
| KR | 20190059242 | A | 5/2019 |
| KR | 20190065157 | A | 6/2019 |
| KR | 102016510 | B1 | 9/2019 |
| KR | 20200029373 | A | 3/2020 |
| KR | 102217302 | B1 | 2/2021 |
| KR | 20210021777 | A | 3/2021 |
| KR | 102306548 | B1 | 9/2021 |
| KR | 20220029215 | A | 3/2022 |
| WO | 2019009595 | A1 | 1/2019 |

* cited by examiner

LITHIUM SECONDARY BATTERY WITH INHIBITED EXSOLUTION OF TRANSITION METAL

CROSS-REFERENCE TO RELATED APPLICATIONS

This application claims priority from Korean Patent Application No. 10-2022-0034571, filed on Mar. 21, 2022, and Korean Patent Application No. 10-2023-0013790, filed on Feb. 1, 2023, both the disclosures of which are incorporated by reference herein.

TECHNICAL FIELD

The present disclosure relates to a lithium secondary battery having inhibited exsolution of a metal, particularly a transition metal, into an electrolyte.

BACKGROUND OF THE INVENTION

In recent years, secondary batteries have been widely applied to small devices such as portable electronic devices, as well as medium and large devices such as battery packs for hybrid vehicles or electric vehicles, or power storage devices.

Graphite is used mainly as a negative electrode material of a lithium secondary battery, but it is difficult to realize the high capacity of a lithium secondary battery because graphite has a low capacity of 372 mAh/g per unit mass. Therefore, negative electrode materials forming compounds between lithium and metals, such as silicon, tin and oxides thereof, and the like, have been developed and used as non-carbon negative electrode materials having higher energy density than graphite in order to realize the high capacity of the lithium secondary battery. However, such non-carbon negative electrode materials have a high capacity, but have drawbacks in that a large amount of lithium is consumed during an initial charging/discharge cycle due to its low initial efficiency, and the irreversible capacity loss may be large.

In this regard, there has been proposed a method capable of providing a lithium ion source or reservoir to a positive electrode material and overcoming the loss of irreversible capacity of a negative electrode using a material which is electrochemically active after the first cycle in order to prevent degradation of the overall performance of the battery.

Specifically, there is a known method of applying an oxide including an excessive amount of lithium, such as $Li_6CoO_4$, $Li_2NiO_2$ or $Li_5FeO_4$, for example, as sacrificial positive electrode materials or irreversible additives (or overdischarge inhibitors).

However, such irreversible additives have a very low powder electrical conductivity of approximately $10^{-11}$ S/cm, which is close to that of an insulator, due to their 2D percolating network. Such low powder electrical conductivity serves to increase the electrical resistance of the positive electrode, and such high electrical resistance acts to reduce battery performance (such as capacity, and the like). Also, the irreversible additives are structurally unstable, and thus may compensate for the loss of irreversible capacity of the negative electrode by preferentially providing lithium ions during an initial charging reaction of the battery. However, side reactions of an electrolyte may be caused as lithium ions are lost and metal ions such as nickel (Ni), cobalt (Co), and the like are exsolved from the residual products into the electrolyte. Therefore, the irreversible additives have a limitation in that the performance (such as a capacity retention rate, and the like) of the battery may be degraded.

Therefore, there is a need for development of a lithium secondary battery capable of exhibiting low resistance in a state in which an irreversible additive, such as $Li_6CoO_4$, or the like, which may compensate for the loss of irreversible capacity of the negative electrode, is included in the positive electrode, and more effectively inhibiting and/or preventing metal ions ($M^+$) from being exsolved from the irreversible additive into the electrolyte.

RELATED ART DOCUMENTS

Patent Documents

Patent Document 1: Japanese Patent Application Laid-Open Publication No. 2019-61750

BRIEF SUMMARY OF THE INVENTION

Therefore, the present disclosure is believed to solve at least some of the above problems. For example, an aspect of the present disclosure provides a lithium secondary battery that exhibits low battery resistance and has inhibited exsolution of metal ions (M+) from an irreversible additive, such as $Li_6CoO_4$ containing an excessive amount of lithium, or the like.

To solve the above problems, according to one exemplary embodiment of the present disclosure, there is provided a lithium secondary battery, which includes an electrode assembly including a positive electrode, a negative electrode, and a separator interposed between the positive electrode and the negative electrode; and an electrolyte composition including a lithium salt, an electrolyte additive having a unit represented by the following Formula 1, and a non-aqueous solvent, wherein the positive electrode includes a positive electrode active layer containing an irreversible additive represented by the following Formula 2, and the electrolyte additive has a weight average molecular weight of less than 40,000 g/mole:

[Formula 1]

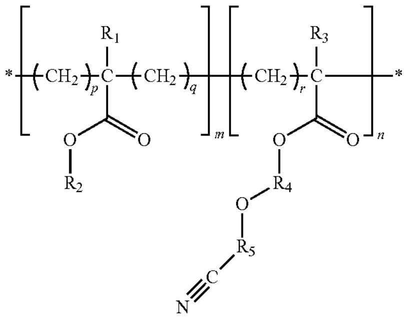

[Formula 2]

$$Li_aM_bM'_{1-b}O_c$$

(wherein:

$R_1$, $R_2$, and $R_3$ are each independently a hydrogen or an alkyl group having 1 to 6 carbon atoms, $R_4$ and $R_5$ are each independently an alkylene group having 1 to 6 carbon atoms, p, q, and r are each independently an integer ranging from 0 to 5, m and n are each independently an integer ranging from 10 to 200, M includes one or more of Co, Ni, Mn, or Fe, M' includes one or more of Co, Ni, Mn, Fe, Al, Mg, Zn, or Ti, provided that M and M' are different from each other, and a, b and c are in a range of $1.50 \leq a \leq 6.5$, $0 \leq b \leq 1$, and $1.5 \leq c \leq 4.5$, respectively).

Specifically, in the unit represented by Formula 1, $R_1$, $R_2$, and $R_3$ may each independently be hydrogen or a methyl group, $R_4$ and $R_5$ may each independently be an ethylene group or a propylene group, and p, q, and r may each independently be an integer ranging from 0 to 2.

Also, the unit represented by Formula 1 may have a m:n ratio of 1:1.01 to 1:10.

In addition, the electrolyte additive may have a weight average molecular weight of 5,000 to 30,000 g/mole.

Also, the electrolyte additive may have a bimodal molecular weight distribution, and may have a polydispersity index (PDI) of 1.2 to 5.0.

In addition, the electrolyte additive may be included at less than 5% by weight based on the total weight of the electrolyte composition.

Also, the electrolyte composition may include an electrolyte auxiliary additive which includes one or more cyclic carbonate compounds selected from vinylene carbonate (VC), vinylethylene carbonate (VEC), or fluoroethylene carbonate (FEC); and one or more sultone compounds selected from 1,3-propane sultone (PS), 1,4-butane sultone, ethene sultone, 1,3-propene sultone (PRS), 1,4-butene sultone, or 1-methyl-1,3-propene sultone.

In addition, the irreversible additive represented by Formula 2 may include one or more of $Li_6CoO_4$, $Li_6NiO_4$, $Li_2NiO_2$, $Li_6MnO_4$, $Li_2MnO_3$, $Li_5FeO_4$, $Li_6Co_{0.9}Al_{0.1}O_4$, $Li_6Co_{0.7}Zn_{0.3}O_4$, $Li_6Ni_{0.9}Al_{0.1}O_4$, $Li_6Mn_{0.9}Al_{0.1}O_4$, $Li_5Fe_{0.9}Al_{0.1}O_4$, $Li_6Co_{0.5}Fe_{0.5}O_4$, $Li_6Ni_{0.5}Fe_{0.5}O_4$, or $Li_6Ni_{0.9}Al_{0.1}O_4$.

Also, the irreversible additive may be included at 0.01 to 5% by weight based on the total weight of the positive electrode active layer.

In addition, the positive electrode active layer may include one or more of lithium metal oxides represented by Formula 3 as a positive electrode active material:

$$Li_x[Ni_yCo_zMn_wM^1_v]O_2 \quad \text{[Formula 3]}$$

wherein:

$M^1$ includes one or more elements selected from W, Cu, Fe, V, Cr, Ti, Zr, Zn, Al, In, Ta, Y, La, Sr, Ga, Sc, Gd, Sm, Ca, Ce, Nb, Mg, B, or Mo, and x, y, z, w, and v are in a range of $1.0 \leq x \leq 1.30$, $0 \leq y \leq 1$, $0 \leq z \leq 1$, $0 \leq w \leq 1$, $0 \leq v \leq 0.1$, respectively, provided that $y+z+w+v=1$.

Also, the negative electrode may include a negative electrode active layer including a negative electrode active material, and the negative electrode active material may include one or more carbon materials selected from natural graphite, artificial graphite, expanded graphite, non-graphitizable carbon, carbon black, acetylene black, or ketjen black.

In addition, the negative electrode active material may further include one or more silicon materials selected from silicon (Si), silicon carbide (SiC), or silicon oxide ($SiO_q$; provided that $0.8 \leq q \leq 2.5$). In this case, the silicon materials may be included at 1 to 20% by weight based on the total weight of the negative electrode active material.

According to another exemplary embodiment of the present disclosure, there is provided a lithium secondary battery module, which includes:

the lithium secondary battery according to the present disclosure; and a module case having the lithium secondary battery installed therein.

A lithium secondary battery according to the present disclosure includes $Li_6CoO_4$ containing excess lithium, or the like as an irreversible additive in a positive electrode, and at the same time, includes an electrolyte additive of Formula 1 having a specific molecular weight in an electrolyte to realize low battery resistance and effectively prevent metal ions from being exsolved from the irreversible additive, and thus has advantages of excellent battery performance and lifespan.

DETAILED DESCRIPTION OF THE INVENTION

The present disclosure may have various modifications and various examples, and thus specific examples of the present disclosure are described in detail in the detailed description.

However, it should be understood that the present disclosure is not intended to be limited to the specific embodiments, and includes all modifications, equivalents or alternatives within the spirit and technical scope of the present disclosure.

The terms "comprise," "include" and "have" used herein specify the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

Also, when a part of a layer, film, region or plate is disposed "on" another part, this includes not only a case in which one part is disposed "directly on" another part, but a case in which a third part is interposed therebetween. In contrast, when a part of a layer, film, region or plate is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

In addition, unless specifically stated otherwise, the symbol "*" refers to a bond formed between the same or different atoms or the terminals of the formulas.

In the present disclosure, the term "alkyl group" refers to a linear or branched monovalent saturated hydrocarbon group. As one example, the alkyl group may be substituted or unsubstituted. The alkyl group includes a methyl group, an ethyl group, a propyl group, an isopropyl group, a butyl group, an isobutyl group, a tert-butyl group, a pentyl group, a 3-pentyl group, and the like, but the present disclosure is not limited thereto.

In the present disclosure, the term "alkylene group" also refers to a linear or branched divalent unsaturated hydrocarbon group. As one example, the alkylene group may be substituted or substituted. The alkylene group includes a methylene group, an ethylene group, a propylene group, an isopropylene group, a butylene group, an isobutylene group, a tert-butylene group, a pentylene group, a 3-pentylene group, and the like, but the present disclosure is not limited thereto.

In addition, in the present disclosure, the term “unit” or “repeating unit” refers to a component that constitutes an oligomer and/or a polymer, and includes a chemical structure derived from a monomer used during polymerization.

Hereinafter, the present disclosure will be described in detail.

Lithium Secondary Battery

According to one exemplary embodiment of the present disclosure, there is provided a lithium secondary battery which includes:

an electrode assembly including a positive electrode, a negative electrode, and a separator interposed between the positive electrode and the negative electrode; and an electrolyte composition including a lithium salt, an electrolyte additive having a unit represented by the following Formula 1, and a non-aqueous solvent, wherein the positive electrode includes a positive electrode active layer containing an irreversible additive capable of supplying an excessive amount of lithium ions, and the electrolyte additive has a weight average molecular weight of less than 40,000 g/mole:

[Formula 1]

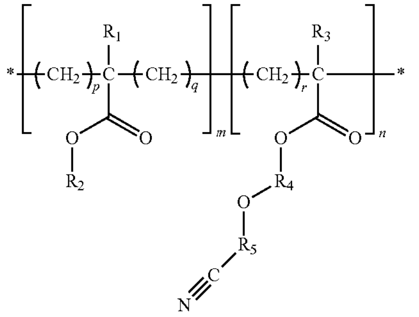

wherein:

$R_1$, $R_2$, and $R_3$ are each independently hydrogen or an alkyl group having 1 to 6 carbon atoms, $R_4$ and $R_5$ are each independently an alkylene group having 1 to 6 carbon atoms, p, q, and r are each independently an integer ranging from 0 to 5, m and n are each independently an integer ranging from 10 to 200.

The lithium secondary battery according to the present disclosure includes an electrode assembly including a positive electrode, a negative electrode, a separator interposed between the positive electrode and the negative electrode; and an electrolyte composition impregnated into the electrode assembly.

In this case, the positive electrode may have a positive electrode active layer, which contains a positive electrode active material along with an irreversible additive capable of supplying excess lithium ions, on a positive electrode current collector, and an electrolyte composition includes an electrolyte additive having a specific chemical structure and molecular weight in order to prevent and/or inhibit a metal from being exsolved from the irreversible additive after the initial charging of the battery.

Specifically, the electrolyte additive used in the present disclosure may have a unit represented by the following Formula 1:

[Formula 1]

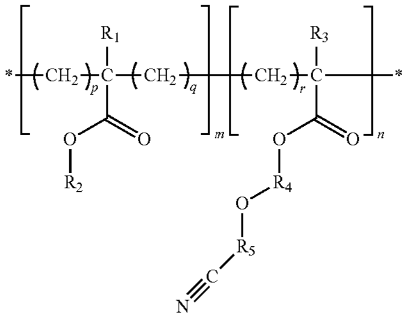

wherein:

$R_1$, $R_2$, and $R_3$ are each independently hydrogen or an alkyl group having 1 to 6 carbon atoms, $R_4$ and $R_5$ are each independently an alkylene group having 1 to 6 carbon atoms, p, q, and r are each independently an integer ranging from 0 to 5, m and n are each independently an integer ranging from 10 to 200.

More specifically, in the unit represented by Formula 1, $R_1$, $R_2$, and $R_3$ may each independently be hydrogen or a methyl group, $R_4$ and $R_5$ may each independently be an ethylene group or a propylene group, and p, q, and r may each independently be an integer ranging from 0 to 2.

As one example, the unit represented by Formula 1 may include one or more of the following Structural Formulas 1 to 4:

<Structural Formula 1>

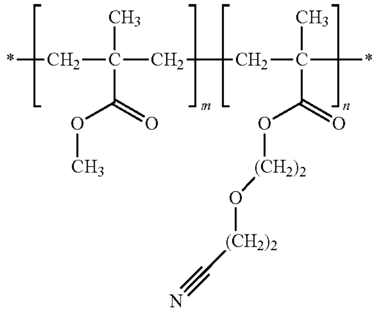

<Structural Formula 2>

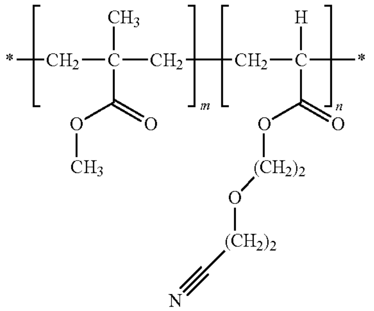

-continued

<Structural Formula 3>

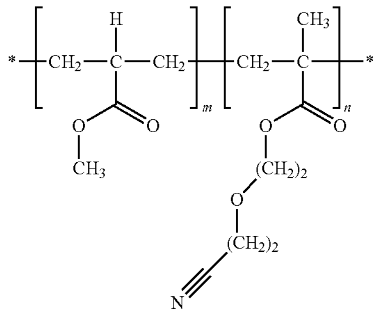

<Structural Formula 4>

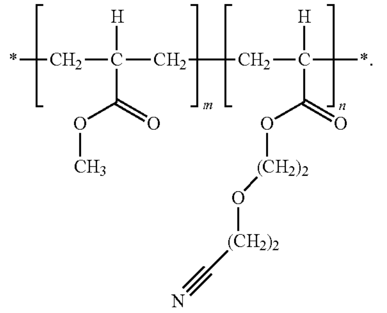

The unit represented by Formula 1 may include a repeating unit derived from an alkyl acrylate having 1 to 6 carbon atoms, and thus may have excellent solubility in an organic solvent, specifically a non-aqueous solvent.

Also, the unit represented by Formula 1 includes a repeating unit containing a cyano group (—CN), and thus may induce a coordinate bond between a cyano group and a metal ion exsolved from the irreversible additive, particularly, a transition metal ion such as nickel (Ni), cobalt (Co), manganese (Mn), and the like. Therefore, the unit represented by Formula 1 may easily capture metal ions, thereby preventing an increase in concentration of metal ions in an electrolyte.

Therefore, in the present disclosure, the ratio of the number (m) of repeating units derived from an alkyl acrylate having 1 to 6 carbon atoms and the number (n) of repeating units containing a cyano group may be adjusted to satisfy a certain ratio range in order to optimize the solubility of the unit represented by Formula 1 in a non-aqueous solvent and metal ion capture efficiency. Specifically, the unit represented by Formula 1 may have a m:n ratio of 1:1.01 to 1:10, more specifically a m:n ratio of 1:2 to 1:10, 1:2 to 1:8, 1:2 to 1:6, 1:3 to 1:7 1:5 to 1:10, or 1:3 to 1:5. When m is 1, and n in Formula 1 is less than 1.01, metal ion capture efficiency may be significantly degraded, and an increase in battery resistance may also be caused, thereby reducing the charge/discharge capacity. On the other hand, when m is 1, and n is greater than 10, ion conductivity may be degraded, and the battery safety at a high temperature may be reduced.

Also, the electrolyte additive may have a weight average molecular weight of less than 40,000 g/mole. Specifically the electrolyte additive may have a weight average molecular weight of 1,000 to 40,000 g/mole; 2,000 to 35,000 g/mole; 5,000 to 30,000 g/mole; 5,000 to 25,000 g/mole; 5,000 to 15,000 g/mole; 8,000 to 19,000 g/mole; or 10,000 to 20,000 g/mole. When the weight average molecular weight of the electrolyte additive is greater than or equal to 40,000 g/mole, electrolyte impregnability and the initial resistance and resistance increase rate of the battery may be remarkably enhanced, resulting in a reduced capacity. In this case, the efficiency of exsolved metal ion capture may also be remarkably degraded as the aggregation of the electrolyte additive itself is induced. Even when the aggregation phenomenon is induced, the electrolyte additive may form a precipitate with the captured metal ions to clog the pores of the separator, resulting in degraded electrical properties of the battery. Also, when the weight average molecular weight of the electrolyte additive is less than 1,000 g/mole, the ability of the electrolyte additive to capture metal ions may not be sufficiently achieved, resulting in a remarkable increase in concentration of metal ions exsolved in the electrolyte composition.

In addition, the electrolyte additive may have a bimodal molecular weight distribution pattern. The expression "having a bimodal molecular weight distribution pattern" may mean that an electrolyte composition includes two electrolyte additives each having the unit represented by Formula 1 with different molecular weights. Here, the bimodal molecular weight distribution pattern may be measured by GPC, and may be calculated using a standard polystyrene conversion method.

As one example, the electrolyte additive includes the unit represented by Formula 1, wherein the electrolyte additive includes a first electrolyte additive having a weight average molecular weight of 12,000±500 g/mole and a second electrolyte additive having a weight average molecular weight of 15,000±500 g/mole. In this case, a bimodal pattern spectrum having two peaks in the vicinity of molecular weights of 12,000 and 15,000, respectively, may be obtained, as measured for the electrolyte additive by GPC. In this case, the second electrolyte additive may be included at 10 to 200 parts by weight based on 100 parts by weight of the first electrolyte additive having a smaller weight average molecular weight, and specifically, it may be included at 10 to 100 parts by weight; 70 to 130 parts by weight; 110 to 200 parts by weight; or 110 to 150 parts by weight based on 100 parts by weight of the first electrolyte additive.

When the electrolyte additive having a bimodal molecular weight distribution is included in the present disclosure, an exsolution rate of the metal ions may be effectively lowered while minimizing an increase in resistance of the secondary battery. Specifically, in the electrolyte additive according to the present disclosure, as the weight average molecular weight increases within in a range having a weight average molecular weight of less than 40,000 g/mole, the number of cyano groups in the electrolyte additive molecule increases, so the opportunity of coordinate bonding with transition metal ions such as nickel (Ni), cobalt (Co), manganese (Mn), etc. is increased. Accordingly, as the weight average molecular weight of the electrolyte additive increases within a range having a weight average molecular weight of less than 40,000 g/mole, the electrolyte additive may have an increased performance in capturing metal ions, and at the same time, it may have an increased resistance to the surface of the positive electrode due to an increase in the degree of absorption to the surface of the positive electrode active layer containing nickel (Ni), cobalt (Co), manganese (Mn), etc. Therefore, by including two types of electrode additives having different weight average molecular weights within a range having a weight average molecular weight of less than 40,000 g/mole, the present disclosure may effectively capture transition metals while preventing an increase in resistance to the electrode surface.

Also, the electrolyte additive may have a polydispersity index (PDI) of 1.2 to 5.0. The polydispersity index (PDI) is a value (Mw/Mn) obtained by dividing a weight average molecular weight (Mw) by a number average molecular weight (Mn) of an electrolyte additive. In this case, the electrolyte additive of the present disclosure may have a polydispersity index of 1.2 to 4.5, 1.2 to 4.0, 1.2 to 3.5, 1.2 to 3.0, 1.2 to 2.5, 1.2 to 1.9, 1.5 to 2.5, 1.8 to 3.1, or 1.6 to 2.2.

As one example, the electrolyte additive may have a polydispersity index of 1.8 to 2.1.

As another example, the electrolyte additive includes the unit represented by Formula 1, wherein, when the electrolyte additive has a bimodal molecular weight distribution because the electrolyte additive includes a first electrolyte additive having a weight average molecular weight of 12,000±500 g/mole and a second electrolyte additive having a weight average molecular weight of 15,000±500 g/mole, each of the first electrolyte additive and the second electrolyte additive may have a polydispersity index of 1.6 to 2.0.

In addition, the electrolyte additive may be included at less than 5% by weight based on the total weight of the electrolyte composition. Specifically, the electrolyte additive may be included at 0.05 to 5% by weight; 0.05 to 4% by weight; 0.05 to 3% by weight 0.1 to 2.5% by weight; 0.1 to 2.2% by weight; 0.2 to 1.6% by weight; 0.9 to 1.9% by weight; 1.6 to 2.3% by weight; or 0.1 to 0.8% by weight based on the total weight of the electrolyte composition.

In the present disclosure, when the content of the electrolyte additive is adjusted within this content range, an increase in internal resistance of the battery due to excess electrolyte additive and the degradation of ion conductivity may be prevented. Also, it is possible to reduce side reactions between the electrolyte composition and the positive electrode active layer, and prevent a decrease in ability to capture the metal ions due to a trace amount of the electrolyte additive.

Meanwhile, the electrolyte composition includes a lithium salt and a non-aqueous solvent in addition to the above-described electrolyte additive.

In this case, the lithium salt may be applied without any particular limitation as long as it is used in the non-aqueous electrolyte in the art. Specifically, the lithium salt may include one or more selected from LiCl, LiBr, LiI, $LiClO_4$, $LiBF_4$, $LiB_{10}C110$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, or $(FSO_2)_2NLi$.

The concentration of the lithium salt is not particularly limited, but the lower limit of an appropriate concentration range is 0.5 mol/L or more, specifically 0.7 mol/L or more, and more specifically 0.9 mol/L or more, and the upper limit of the appropriate concentration range is 2.5 mol/L or less, specifically 2.0 mol/L or less, and more specifically 1.5 mol/L or less. When the concentration of the lithium salt is less than 0.5 mol/L, ion conductivity may be degraded, resulting in degraded cycle characteristics and output characteristics of a non-aqueous electrolyte battery. Also, when the concentration of the lithium salt is greater than 2.5 mol/L, an increase in viscosity of an electrolyte solution for a non-aqueous electrolyte battery may be caused, and thus ion conductivity may be degraded and cycle characteristics and output characteristics of the non-aqueous electrolyte battery may also be degraded.

Also, when a large amount of the lithium salt is dissolved in a non-aqueous organic solvent at one time, a liquid temperature may increase due to the heat of dissolution of the lithium salt. As such, when the temperature of the non-aqueous organic solvent remarkably increases due to the heat of dissolution of the lithium salt, decomposition of a fluorine-containing lithium salt may be promoted, resulting in the generation of hydrogen fluoride (HF). Hydrogen fluoride (HF) is undesirable because it causes the degradation of battery performance. Therefore, the temperature for dissolving the lithium salt in a non-aqueous organic solvent is not particularly limited, but may be adjusted in a range of −20 to 80° C., specifically in a range of 0 to 60° C.

In addition, the non-aqueous organic solvent used in the electrolyte composition may be applied without any particular limitation as long as it is used in the non-aqueous electrolyte in the art. Specifically, for example, aprotic organic solvents such as N-methyl-2-pyrrolidinone, ethylene carbonate (EC), propylene carbonate (PC), propylene carbonate, butylene carbonate, dimethyl carbonate (DMC), diethyl carbonate (DEC), gamma-butyrolactone, 1,2-dimethoxy ethane (DME), tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidone, propylene carbonate derivatives, tetrahydrofuran derivatives, ether, methyl propionate (MP), ethyl propionate (EP), propyl propionate (PP), and the like may be used as the non-aqueous organic solvent.

Also, the non-aqueous organic solvent used in the present disclosure may be used alone, or two or more types may be used after mixing in any ratio and combination according to a purpose. Among them, propylene carbonate, ethylene carbonate, fluoroethylene carbonate, diethyl carbonate, dimethyl carbonate, and ethyl methyl carbonate are particularly preferred in terms of the electrochemical stability in an oxidation/reduction reaction and the chemical stability against heat or a reaction with a solute.

In addition, the electrolyte composition may further include an electrolyte auxiliary additive, when necessary, in order to prevent the collapse of the negative electrode due to the decomposition of a non-aqueous electrolyte under high-power conditions, or further improve low-temperature high-rate discharge characteristics, high-temperature stability, overcharge protection, a battery expansion inhibition effect at high temperature, and the like.

Specifically, the electrolyte auxiliary additive may include one or more of a cyclic carbonate compound or a sultone compound, which may be preferably used in combination. In this case, in an initial activation process of the battery, a more uniform SEI film may be formed on a surface of the negative electrode, and high temperature stability may be improved, which makes it possible to inhibit the gas generation due to electrolyte decomposition.

In this case, the cyclic carbonate compound may include one or more of vinylene carbonate (VC), vinylethylene carbonate (VEC), or fluoroethylene carbonate (FEC), and the sultone compound may include one or more of 1,3-propane sultone (PS), 1,4-butane sultone, ethene sultone, 1,3-propene sultone (PRS), 1,4-butene sultone, or 1-methyl-1,3-propene sultone.

Also, the electrolyte auxiliary additive may be included at 0.01 to 10% by weight, specifically 0.05 to 5% by weight, or 1.5 to 3% by weight based on the total weight of the electrolyte composition. In the present disclosure, when the content of the electrolyte additive is adjusted within this content range, it is possible to prevent the degradation of resistance characteristics of the battery by the additive being present in a state of being precipitated at room temperature due to excess auxiliary additive. Also, it is possible to prevent the insufficient realization of an effect of improving high-temperature lifespan characteristics due to the addition of a trace amount of the auxiliary additive.

Meanwhile, the positive electrode may have a positive electrode active layer, which contains a positive electrode active material along with an irreversible additive capable of supplying excess lithium ions, on a positive electrode current collector. Specifically, the positive electrode has a positive electrode active layer which is prepared by coating, drying and pressing a slurry including a positive electrode active material on positive electrode current collector, and may optionally further include a conductive material, a binder, and other additives, when necessary.

In this case, the positive electrode active material is a material that may cause an electrochemical reaction on the positive electrode current collector, and may be a lithium composite transition metal oxide including two or more elements selected from nickel (Ni), cobalt (Co), manganese (Mn), aluminum (Al), zinc (Zn), titanium (Ti), magnesium (Mg), chromium (Cr), or zirconium (Zr). For example, the positive electrode active material may include one or more lithium metal oxides represented by Formula 3 capable of reversible intercalation and deintercalation of lithium ions:

$$Li_x[Ni_yCo_zMn_wM^1_v]O_2 \quad \text{[Formula 3]}$$

wherein:

$M^1$ includes one or more elements selected from W, Cu, Fe, V, Cr, Ti, Zr, Zn, Al, In, Ta, Y, La, Sr, Ga, Sc, Gd, Sm, Ca, Ce, Nb, Mg, B, or Mo, x, y, z, w, and v are in a range of $1.0 \le x \le 1.30$, $0 \le y \le 1$, $0 \le z \le 1$, $0 \le w \le 1$, $0 \le v \le 0.1$, respectively, provided that $y+z+w+v=1$.

When the lithium metal oxide represented by Formula 3 is used as a positive electrode active material, the lithium metal oxide has an advantage of stably supplying high capacity electricity and/or high voltage electricity.

In this case, the lithium metal oxide represented by Formula 3 may include lithium cobalt oxide ($LiCoO_2$), lithium nickel oxide ($LiNiO_2$), lithium manganese oxide ($LiMnO_2$, $LiMn_2O_4$, and the like), lithium nickel cobalt manganese oxide ($LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$), and the like.

Also, a content of the positive electrode active material may be in a range of 85 to 95 parts by weight, specifically in a range of 88 to 95 parts by weight, 90 to 95 parts by weight, 86 to 90 parts by weight, or 92 to 95 parts by weight based on 100 parts by weight of a positive electrode active layer.

Furthermore, the positive electrode active layer includes a positive electrode active material exhibiting electrical activity along with an irreversible additive imparting an irreversible capacity. In this case, the irreversible additive may be a compound represented by the following Formula 2:

$$Li_aM_bM'_{1-b}O_c \quad \text{[Formula 2]}$$

wherein:

M includes one or more of Co, Ni, Mn, or Fe,

M' includes one or more of Co, Ni, Mn, Fe, Al, Mg, Zn, or Ti, provided that M and M' are different from each other, a, b, and c are in a range of $1.50 \le a \le 6.5$, $0 \le b \le 1$, and $1.5 \le c \le 4.5$, respectively.

When the irreversible additive includes lithium in excess, lithium may be provided for the lithium consumption caused by an irreversible chemical/physical reaction at the negative electrode during initial charging. Therefore, an increase in charging capacity of the battery and a decrease in irreversible capacity of the battery may be caused, resulting in improved lifespan characteristics.

Such an irreversible additive represented by Formula 2 may include one or more of $Li_6CoO_4$, $Li_6NiO_4$, $Li_2NiO_2$, $Li_6MnO_4$, $Li_2MnO_3$, $Li_5FeO_4$, $Li_6Co_{0.9}Al_{0.1}O_4$, $Li_6Co_{0.7}Zn_{0.3}O_4$, $Li_6Ni_{0.9}Al_{0.1}O_4$, $Li_6Mn_{0.9}Al_{0.1}O_4$, $Li_5Fe_{0.9}Al_{0.1}O_4$, $Li_6Co_{0.5}Fe_{0.5}O_4$, $Li_6Ni_{0.5}Fe_{0.5}O_4$, or $Li_6Ni_{0.9}Al_{0.1}O_4$.

Among them, a cobalt-based additive such as $Li_6CoO_4$ or $Li_6Co_{0.7}Zn_{0.3}O_4$ may be used to replenish lithium ions lost in an irreversible reaction during the initial activation of the battery because the cobalt-based additive has a high content of lithium ions compared to nickel-containing oxides widely used in the art, which makes it possible to remarkably improve the charge/discharge capacity of the battery. Also, the cobalt-based additive has no side reactions caused by the exsolution of a transition metal during the charging/discharging cycle of the battery compared to iron- and/or manganese-containing oxides widely used in the art, the cobalt-based additive has an advantage of excellent battery stability.

In addition, the irreversible additive may have an average particle size of 0.1 to 10 μm, specifically an average particle size of 0.1 to 8 μm; 0.1 to 5 μm; 0.1 to 3 μm; 0.5 to 2 μm; 0.1 to 0.9 μm; 0.1 to 0.5 μm; 0.6 to 0.9 μm; 1 to 4 μm; 4 to 6 μm; or 6 to 9 μm. In the present disclosure, when the average particle size of the irreversible additive is controlled in the above particle size range, it is possible to prevent the degradation of powder electrical conductivity of the irreversible additive while increasing irreversible activity.

Also, the irreversible additive may be included at 0.01 to 5 parts by weight based on the total weight of the positive electrode active layer. Specifically, the irreversible additive may be included at 0.01 to 4 parts by weight; 0.01 to 3 parts by weight; 0.01 to 2 parts by weight; 0.1 to 1 parts by weight; 0.5 to 2 parts by weight; 1 to 3 parts by weight; 2 to 4 parts by weight; 1.5 to 3.5 parts by weight; 0.5 to 1.5 parts by weight; 1 to 2 parts by weight; 0.1 to 0.9 parts by weight; or 0.3 to 1.2 parts by weight based on the total weight of the positive electrode active layer.

In addition, the positive electrode active layer may further include a binder, a conductive material, other additives, and the like in addition to the positive electrode active material and the irreversible additive.

In this case, the conductive material may be used to improve the performance (such as electrical conductivity, and the like) of the positive electrode, and may include one or more selected from natural graphite, artificial graphite, carbon black, acetylene black, ketjen black, carbon nanotubes, graphene, or carbon fibers. For example, the conductive material may include acetylene black.

Also, the conductive material may be included at 0.5 to 5 parts by weight based on 100 parts by weight of the positive electrode active layer. Specifically, the conductive material may be included at 0.5 to 4 parts by weight; 0.5 to 3 parts by weight; 0.5 to 1 parts by weight; 0.5 to 2 parts by weight; 1 to 3 parts by weight; 2 to 4 parts by weight; 1.5 to 3.5 parts by weight; 0.5 to 1.5 parts by weight; or 1 to 2 parts by weight based on 100 parts by weight of the positive electrode active layer.

In addition, the binder may include one or more resins selected from a polyvinylidene fluoride-hexafluoropropylene copolymer (PVdF-co-HFP), polyvinylidene fluoride (PVdF), polyacrylonitrile, polymethyl methacrylate, or a copolymer thereof. As one example, the binder may include polyvinylidene fluoride.

Also, the positive electrode active layer may include 1 to 10 parts by weight, specifically 2 to 8 parts by weight, or 1 to 5 parts by weight of the binder based on 100 parts by weight of the positive electrode active layer.

In addition, an average thickness of the positive electrode active layer is not particularly limited, but specifically may be in a range of 50 μm to 300 μm, and more specifically in a range of 100 μm to 200 μm; 80 μm to 150 μm; 120 μm to 170 μm; 150 μm to 300 μm; 200 μm to 300 μm; or 150 μm to 190 μm.

Also, as the positive electrode current collector in the positive electrode, a material having high conductivity without causing a chemical change in the corresponding battery may be used. For example, stainless steel, aluminum, nickel, titanium, calcined carbon, and the like may be used. In the case of aluminum or stainless steel, those surface-treated with carbon, nickel, titanium, silver, and the like may also be used. Also, the positive electrode current collector may have fine irregularities formed on a surface thereof to enhance the adhesive strength of the positive electrode active material, and various forms thereof such as films, sheets, foil, nets, porous materials, foams, non-woven fabrics, and the like are possible. In addition, the average thickness of the positive electrode current collector may be properly adjusted in a range of 3 to 500 μm in consideration of the conductivity and total thickness of the manufactured positive electrode.

In addition, the negative electrode may be manufactured by coating, drying and pressing a negative electrode active layer including a negative electrode active material on the negative electrode current collector. In this case, the negative electrode active layer may optionally further include a conductive material as in the positive electrode, an organic binder polymer, and other additives, when necessary.

Here, the negative electrode active material may include one or more selected from lithium metal, nickel metal, copper metal, SUS metal, a carbon material capable of reversible intercalation/deintercalation of lithium ions, a metal or an alloy of these metals with lithium, a metal composite oxide, a material capable of doping and dedoping lithium, or a transition metal oxide.

As one example, the negative electrode active material may include one or more carbon materials selected from natural graphite, artificial graphite, expanded graphite, non-graphitizable carbon, carbon black, acetylene black, or ketjen black.

Also, the negative electrode active material may further include a silicon material in addition to the carbon material in order to further enhance the charge/discharge capacity of the battery. The silicon material refers to a material including silicon atoms as a main component. In this case, as such a silicon material, silicon (Si), silicon carbide (SiC), silicon monoxide (SiO), or silicon dioxide ($SiO_2$) may be used alone or in combination. When silicon monoxide (SiO) and silicon dioxide ($SiO_2$) are uniformly mixed or complexed as the silicon (Si)-containing material and included in the negative electrode mixture layer, it may be represented by silicon oxide ($SiO_q$; provided that $0.8 \leq q \leq 2.5$).

In addition, the silicon material may be included at 1 to 20% by weight, specifically 3 to 10% by weight; 8 to 15% by weight; 13 to 18% by weight; or 2 to 8% by weight based on the total weight of the negative electrode active material. In the present disclosure, when the content of the silicon material is adjusted in the content range as described above, the energy density of the battery may be maximized.

Also, the negative electrode current collector is not particularly limited as long as it has high conductivity without causing a chemical change in the corresponding battery, and for example, as the negative electrode current collector, stainless steel, aluminum, nickel, titanium, calcined carbon, and the like may be used, and in the case of aluminum or stainless steel, those surface-treated with carbon, nickel, titanium, silver, and the like may be used. In addition, the average thickness of the negative electrode current collector may be properly adjusted in a range of 1 to 500 μm in consideration of the conductivity and total thickness of the manufactured negative electrode.

According to one exemplary embodiment of the present disclosure, there is provided a method of preparing a lithium secondary battery, the method comprising:

preparing an electrode assembly and an electrolyte composition, and impregnating the electrolyte composition into the electrode assembly, wherein the electrolyte composition comprises a lithium salt, an electrolyte additive having a unit represented by the following Formula 1, and a non-aqueous solvent, wherein the electrode assembly comprises a positive electrode, a negative electrode, and a separator interposed between the positive electrode and the negative electrode, and wherein the positive electrode comprises a positive electrode active layer containing an irreversible additive capable of supplying an excessive amount of lithium ions,

[Formula 1]

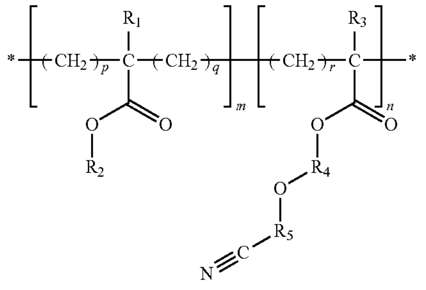

wherein:

$R_1$, $R_2$, and $R_3$ are each independently hydrogen or an alkyl group having 1 to 6 carbon atoms, $R_4$ and $R_5$ are each independently an alkylene group having 1 to 6 carbon atoms, p, q, and r are each independently an integer ranging from 0 to 5, and m and n are each independently an integer ranging from 10 to 200.

The electrolyte composition and the electrode assembly are described as above.

In addition, the form of the lithium secondary battery according to the present disclosure is not particularly limited, but specifically may be cylindrical, prismatic, a pouch-type, or a coin-type. According to one exemplary embodiment of the present disclosure, the lithium secondary battery may be a cylindrical lithium secondary battery, a prismatic lithium secondary battery, a pouch-type lithium secondary battery, or a coin-type lithium secondary battery, particularly, a pouch-type lithium secondary battery.

When the lithium secondary battery according to the present disclosure has a configuration as described above, the lithium ions, which are irreversibly lost during an initial charging process, that is, an activation process, of a secondary battery, may be preserved, thereby enhancing the charge/discharge capacity. Also, the metal ions derived from the positive electrode active layer may be effectively captured to remarkably reduce a concentration of metal ions exsolved in the electrolyte composition, thereby improving the increased resistance and side reactions and the degraded performance of the battery caused by the exsolve metal ions even under high-temperature conditions.

Lithium Secondary Battery Module

According to one exemplary embodiment of the present disclosure, there is also provided a lithium secondary battery module, which includes:

- the above-described lithium secondary battery according to the present disclosure; and
- a module case having the lithium secondary battery installed therein.

The lithium secondary battery module according to the present disclosure is a battery module that includes a plurality of unit cells and a module case configured to accommodate the plurality of unit cells, wherein each of the unit cells includes the lithium secondary battery according to the present disclosure.

When the lithium secondary battery module includes the plurality of lithium secondary batteries of the present disclosure as the unit cells as described above, the lithium secondary battery module has advantages in that it has low initial resistance and a low resistance increase rate and a high voltage retention rate even under high-temperature conditions, and has a characteristic of remarkably reducing a concentration of the exsolved metal ions in the electrolyte composition.

Meanwhile, the present disclosure provides a battery pack including the battery module, and a device including the battery pack as a power source.

In this case, specific examples of the device include power tools powered by an electric motor; electric cars including an electric vehicle (EV), a hybrid electric vehicle (HEV), and a plug-in hybrid electric vehicle (PHEV); electric two-wheeled vehicles including an E-bike and an E-scooter; an electric golf cart; and a power storage system, but the present disclosure is not limited thereto.

Hereinafter, the present disclosure will be described in further detail with reference to the following examples and experimental example.

However, it should be understood that the following examples and experimental example are merely intended to illustrate the present disclosure, and the contents of the present disclosure are not limited to the following examples and experimental example.

EXAMPLES AND COMPARATIVE EXAMPLES

A) Preparation of Electrolyte Composition

As lithium salts, $LiPF_6$ and LiFSI were dissolved at concentrations of 0.8 M and 0.7 M, respectively, in a solvent prepared by mixing ethylene carbonate (EC), ethyl methyl carbonate (EMC), and diethyl carbonate (DMC) at a volume ratio of 20:5:75, and electrolyte additives were weighed and dissolved with the types and contents shown in Table 1 below. Thereafter, as electrolyte auxiliary additives, vinylene carbonate (VC) and 1,3-propane sultone (PS) were added at 2% by weight and 0.5% by weight, respectively, to prepare a non-aqueous electrolyte composition.

Here, in the case of Example 5, two electrolyte additives having a weight average molecular weight of 12,000 g/mole and 15,000 g/mole, respectively, while including the unit represented by Formula 1 were mixed and used in a 1:1 weight ratio.

Also, the weight average molecular weights and PDs of the electrolyte additives were measured using gel permeation chromatography (GPC), and molecular weight distribution patterns were analyzed from the resulting spectra. For the gel permeation chromatography (GPC), Alliance 4 equipment was stabilized. When the equipment was stabilized, a reference sample and a sampling specimen were injected into the equipment to obtain a chromatogram, and a molecular weight was calculated from the obtained results according to an analysis method (System: Alliance 4, Column: Agilent PL mixed B, Eluent: THF, Flow rate: 0.1 mL/min, Temp: 40° C., and Injection volume: 100 μL). The measured results are shown in Table 1.

TABLE 1

| | Types of additives | | Molecular weight | | | Content |
|---|---|---|---|---|---|---|
| | Chemical structure | m/n | Mw [g/mole] | Distribution pattern | PDI | [% by weight] |
| Example 1 | 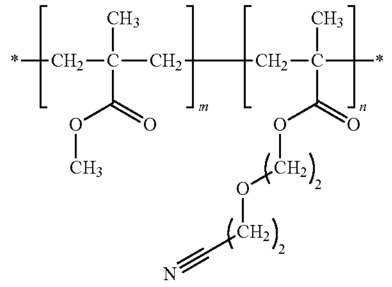 <Structural Formula 1> | 20/80 | 12,000 | Unimodal | 1.6 to 1.8 | 0.3 |
| Example 2 | | 20/80 | 15,000 | Unimodal | 1.6 to 1.8 | 0.3 |
| Example 3 | | 20/80 | 15,000 | Unimodal | 1.6 to 1.8 | 1.5 |
| Example 4 | | 20/80 | 15,000 | Unimodal | 1.6 to 1.8 | 5.0 |
| Example 5 | | 20/80 | 12,000/15,000 | Bimodal | 1.6 to 1.8/1.6 to 1.8 | 1.5 |

TABLE 1-continued

| | Types of additives | | Molecular weight | | | Content |
|---|---|---|---|---|---|---|
| | Chemical structure | m/n | Mw [g/mole] | Distribution pattern | PDI | [% by weight] |
| Example 6 | 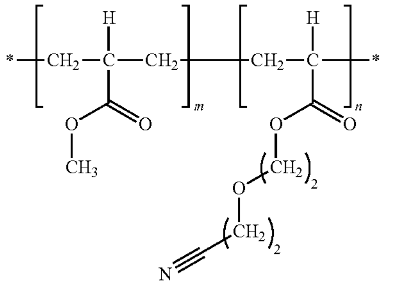 <Structural Formula 4> | 20/80 | 15,000 | Unimodal | 1.6 to 1.8 | 0.3 |
| Comp. Example 1 | 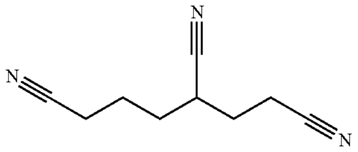 <Structural Formula 5> | — | 161.2 | Unimodal | 1.6 to 1.8 | 0.3 |
| Comp. Example 2 | 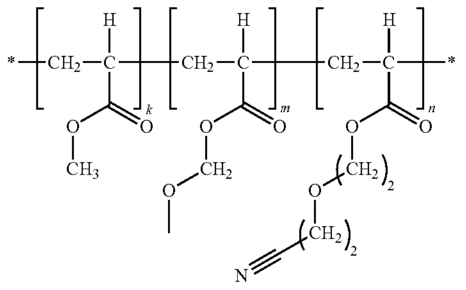 <Structural Formula 6> | (k/m/n) 30/1/69 | 51,000 | Unimodal | 1.6 to 1.8 | 0.3 |
| Comp. Example 3 | | (k/m/n) 30/1/69 | 51,000 | Unimodal | 1.6 to 1.8 | 5.0 |

B) Manufacture of Lithium Secondary Battery

A mixed active material of $LiNi_{0.6}Co_{0.2}Mn_{0.1}Al_{0.1}O_2$ and $LiNiO_2$ (1:1, wt./wt.) was prepared as a positive electrode active material, and the prepared active material, $Li_6CoO_4$ as an irreversible additive, carbon black as a conductive material, and polyvinylidene fluoride as a binder were mixed at a weight ratio of 94:1:3:2 in N-methyl pyrrolidone (NMP) to form a slurry. Thereafter, the slurry was cast on an aluminum thin plate, dried at 120° C. in a vacuum oven, and then rolled to manufacture a positive electrode.

Separately, a mixed active material prepared by mixing artificial graphite and silicon oxide ($SiO_2$) at a weight ratio of 85:15 was prepared as a negative electrode active material, and 97 parts by weight of the negative electrode active material and 3 parts by weight of a styrene butadiene rubber (SBR) were mixed in water to form a slurry. Then, the slurry was cast on a copper thin plate, dried at 130° C. in a vacuum oven, and then rolled to manufacture a negative electrode.

An 18 μm-thick separator composed of polypropylene was interposed between the obtained positive and negative electrodes, and inserted into a case. Thereafter, each of the electrolyte compositions prepared in Examples 1 to 6 and Comparative Examples 1 to 3 was injected to manufacture a lithium secondary battery.

Experimental Example

To evaluate the performance of the lithium secondary battery according to the present disclosure, experiments were performed as follows.

A) Analysis of Initial Resistance

Each of the lithium secondary batteries manufactured in Examples and Comparative Examples was fully charged to a SOC of 100% under a condition of a voltage of 4.25 V. Thereafter, the DC resistance of each of the fully charged lithium secondary batteries was measured, a DC resistance deviation rate of each of the lithium secondary batteries was calculated as the initial resistance based on the DC resistance value for the lithium secondary battery of Comparative Example 1 including HTCN as a monomolecular electrolyte additive. The results are shown in Table 2 below.

B) Analysis of Resistance Increase Rate and Voltage Retention Rate after High-Temperature Storage Each of the lithium secondary batteries manufactured in Examples and Comparative Examples was fully charged to a SOC of 100% under a condition of a voltage of 4.25 V. Thereafter, the AC resistance and voltage of each of the fully charged lithium secondary batteries were measured, and the batteries were left at 72° C. for 55 days. After 55 days had elapsed, the AC resistance and voltage of each of the charged lithium secondary batteries left at a high temperature were measured again, and a resistance increase rate and voltage retention rate according to measured resistances and voltages before and after the high-temperature storage were analyzed. The results are shown in Table 2 below.

C) Analysis of Exsolution Amount of Metal Ions after High-Temperature Storage

Because metals exsolved into an electrolyte were reduced on a surface of an active material layer of the negative electrode to induce side reactions, the content of metal ions remaining on a surface of the negative electrode was measured for the lithium secondary batteries subjected to resistance increase rate and voltage retention rate analysis after high-temperature storage as described above.

Specifically, each of the lithium secondary batteries of Examples and Comparative Example whose resistance increase rate and voltage retention rate were analyzed was disassembled to separate the negative electrode, and a powder of the active material layer obtained by scraping a surface of the active material layer included in the negative electrode was subjected to inductively coupled plasma analysis (ICP) to measure the contents of nickel (Ni), cobalt (Co) and manganese (Mn) ions remaining on a surface of the negative electrode in ppm units. The results are shown in Table 2 below.

TABLE 2

| | Initial resistance [%] | Resistance increase rate [%] | Voltage retention rate [%] | Metal exsolution amount [ppm] |
|---|---|---|---|---|
| Example 1 | −2.1 | 30.4 | 97.1 | 346 |
| Example 2 | −1.3 | 32.1 | 97.0 | 352 |
| Example 3 | +0.3 | 33.1 | 97.1 | 304 |
| Example 4 | +9.3 | 32.4 | 96.7 | 290 |
| Example 5 | 2.5 | 30.2 | 97.2 | 310 |
| Example 6 | −1.8 | 31.2 | 96.8 | 349 |
| Comp. Example 1 | — | 37.5 | 91.5 | 475 |
| Comp. Example 2 | +5.7 | 36.3 | 93.6 | 387 |
| Comp. Example 3 | +13.9 | 37.1 | 92.1 | 412 |

As shown in Table 2, it can be seen that the lithium secondary battery according to the present disclosure has low battery internal resistance as well as a low resistance increase rate, a high voltage retention rate, and a low metal exsolution rate even after being stored at a high temperature.

From these results, it can be seen that the lithium secondary battery according to the present disclosure includes $Li_6CoO_4$ containing excess lithium, or the like as the irreversible additive in the positive electrode, and at the same time, includes the electrolyte additive of Formula 1 having a specific molecular weight in the electrolyte to realize low battery resistance and effectively prevent metal ions from being exsolved from the irreversible additive, and thus has excellent battery performance and lifespan.

As described above, while the present disclosure has been described with reference to exemplary embodiments thereof, it should be understood by those skilled in the art or those of ordinary skill in the art that various modifications and changes can be made to the present disclosure without departing from the spirit and technical scope of the present disclosure described in the accompanying claims.

Accordingly, the technical scope of the present disclosure is not limited to the content described in the detailed description of the specification, but should be defined by the claims.

The invention claimed is:

1. A lithium secondary battery comprising:

an electrode assembly comprising a positive electrode, a negative electrode, and a separator interposed between the positive electrode and the negative electrode; and an electrolyte composition comprising a lithium salt, an electrolyte additive comprising an oligomer or a polymer having a unit represented by Formula 1, and a non-aqueous solvent, wherein the positive electrode comprises a positive electrode active layer containing an irreversible additive represented by Formula 2, and the electrolyte additive has a weight average molecular weight of less than 40,000 g/mole:

[Formula 1]

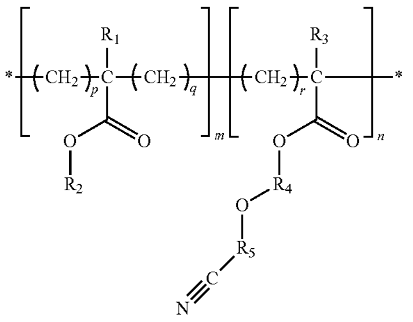

[Formula 2]

$$Li_aM_bM'_{1-b}O_c$$

wherein:

* refers to a bond formed with a terminal of another unit represented by Formula 1, or a terminal of the oligomer or the polymer, $R_1$, $R_2$, and $R_3$ are each independently hydrogen or an alkyl group having 1 to 6 carbon atoms, $R_4$ and $R_5$ are each independently an alkylene group having 1 to 6 carbon atoms, p, q, and r are each independently an integer ranging from 0 to 5, m and n are each independently an integer ranging from 10 to 200, M comprises one or more of Co, Ni, Mn, or Fe, M' comprises one or more of Co, Ni, Mn, Fe, Al, Mg, Zn, or Ti, provided that M and M' are different from each other, and a, b, and c are in a range of $1.50 \leq a \leq 6.5$, $0 \leq b \leq 1$, and $1.5 \leq c \leq 4.5$, respectively.

2. The lithium secondary battery of claim 1, wherein, in the unit represented by Formula 1, $R_1$, $R_2$, and $R_3$ are each independently hydrogen or a methyl group, $R_4$ and $R_5$ are each independently an ethylene group or a propylene group, and p, q, and r are each independently the integer ranging from 0 to 2.

3. The lithium secondary battery of claim 1, wherein the unit represented by Formula 1 comprises one or more of Structural Formulas 1 to 4:

<Structural Formula 1>

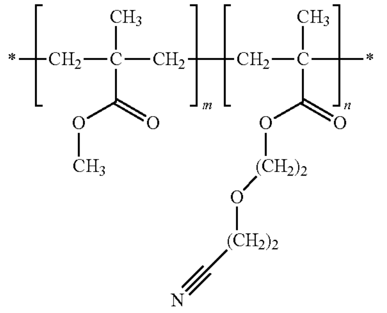

<Structural Formula 2>

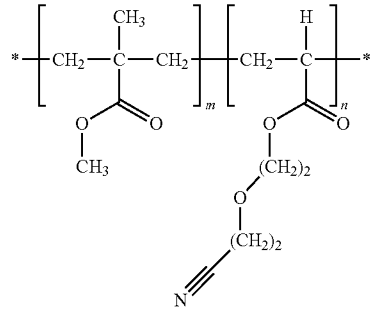

<Structural Formula 3>

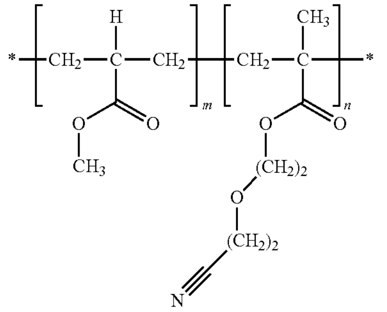

-continued

<Structural Formula 4>

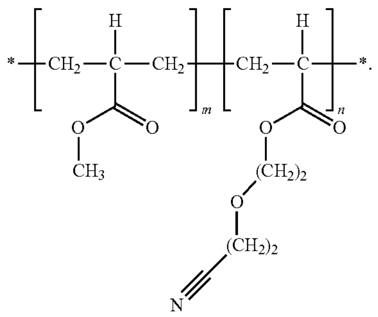

4. The lithium secondary battery of claim 1, wherein the unit represented by Formula 1 has a m:n ratio of 1:1.01 to 1:10.

5. The lithium secondary battery of claim 1, wherein the weight average molecular weight of the electrolyte additive is 5,000 to 30,000 g/mole.

6. The lithium secondary battery of claim 1, wherein the electrolyte additive has a bimodal molecular weight distribution.

7. The lithium secondary battery of claim 1, wherein the electrolyte additive comprises a first electrolyte additive having a weight average molecular weight of 12,000±500 g/mole and a second electrolyte additive having a weight average molecular weight of 15,000±500 g/mole.

8. The lithium secondary battery of claim 7, wherein the second electrolyte additive is included at 10 to 200 parts by weight based on 100 parts by weight of the first electrolyte additive.

9. The lithium secondary battery of claim 1, wherein the electrolyte additive has a polydispersity index (PDI) of 1.2 to 5.0.

10. The lithium secondary battery of claim 1, wherein the electrolyte additive is included at 0.05% by weight to 5% by weight based on a total weight of the electrolyte composition.

11. The lithium secondary battery of claim 1, wherein the electrolyte composition comprises an electrolyte auxiliary additive comprising:

one or more cyclic carbonate compounds selected from vinylene carbonate (VC), vinylethylene carbonate (VEC), or fluoroethylene carbonate (FEC); and one or more sultone compounds selected from 1,3-propane sultone (PS), 1,4-butane sultone, ethene sultone, 1,3-propene sultone (PRS), 1,4-butene sultone, or 1-methyl-1,3-propene sultone.

12. The lithium secondary battery of claim 1, wherein the irreversible additive represented by Formula 2 comprises one or more of $Li_6CoO_4$, $Li_6NiO_4$, $Li_2NiO_2$, $LiMnO_4$, $Li_2MnO_3$, $Li_5FeO_4$, $Li_6Co_{0.9}Al_{0.1}O_4$, $Li_6Co_{0.7}Zn_{0.3}O_4$, $LiNi_{0.9}Al_{0.1}O_4$, $Li_6Mn_{0.9}Al_{0.1}O_4$, $Li_5Fe_{0.9}Al_{0.1}O_4$, $Li_6Co_{0.5}Fe_{0.5}O_4$, $Li_6Ni_{0.5}Fe_{0.5}O_4$, or $Li_6Ni_{0.9}Al_{0.1}O_4$.

13. The lithium secondary battery of claim 1, wherein the irreversible additive is included at 0.01 to 5% by weight based on a total weight of the positive electrode active layer.

14. The lithium secondary battery of claim 1, wherein the positive electrode active layer comprises one or more lithium metal oxides represented by Formula 3 as a positive electrode active material:

$$Li_x[Ni_yCo_zMn_wM^1_v]O_2 \quad \text{[Formula 3]}$$

wherein:

$M^1$ comprises one or more elements selected from W, Cu, Fe, V, Cr, Ti, Zr, Zn, Al, In, Ta, Y, La, Sr, Ga, Sc, Gd, Sm, Ca, Ce, Nb, Mg, B, or Mo, or x, y, z, w, and v are in a range of $1.0 \le x \le 1.30$, $0 \le y \le 1$, $0 \le z \le 1$, $0 \le w \le 1$, $0 \le v \le 0.1$, respectively, provided that $y+z+w+v=1$.

15. The lithium secondary battery of claim 1, wherein the negative electrode comprises a negative electrode active layer comprising a negative electrode active material, and the negative electrode active material comprises one or more carbon materials selected from natural graphite, artificial graphite, expanded graphite, non-graphitizable carbon, carbon black, acetylene black, or ketjen black.

16. The lithium secondary battery of claim 15, wherein the negative electrode active material further comprises a silicon material selected from silicon (Si), silicon carbide (SiC), silicon oxide ($SiO_q$, wherein $0.8 \le q \le 2.5$), or a combination thereof.

17. The lithium secondary battery of claim 16, wherein the silicon material is included at 1 to 20% by weight based on a total weight of the negative electrode active material.

18. A lithium secondary battery module comprising:

the lithium secondary battery according to claim 1; and a module case having the lithium secondary battery installed therein.

19. An electrolyte composition comprising a lithium salt, an electrolyte additive comprising an oligomer or a polymer having a unit represented by Formula 1 and a weight average molecular weight of less than 40,000 g/mole, and a non-aqueous solvent,

[Formula 1]

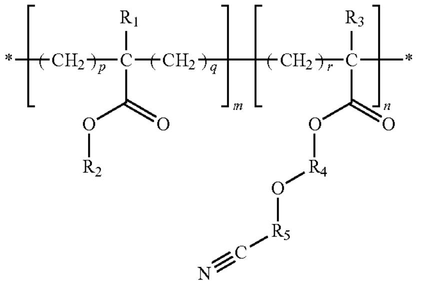

wherein:

* refers to a bond formed with a terminal of another unit represented by Formula 1, or a terminal of the oligomer or the polymer, $R_1$, $R_2$, and $R_3$ are each independently hydrogen or an alkyl group having 1 to 6 carbon atoms, $R_4$ and $R_5$ are each independently an alkylene group having 1 to 6 carbon atoms, p, q, and r are each independently an integer ranging from 0 to 5, and m and n are each independently an integer ranging from 10 to 200.

20. The electrolyte composition of claim 19, wherein the unit represented by Formula 1 has a m:n ratio of 1:1.01 to 1:10.

* * * * *